United States Patent
Dotan et al.

(10) Patent No.: US 8,701,199 B1
(45) Date of Patent: Apr. 15, 2014

(54) ESTABLISHING A TRUSTED SESSION FROM A NON-WEB CLIENT USING ADAPTIVE AUTHENTICATION

(75) Inventors: Yedidya Dotan, Tel Aviv (IL); Lawrence N. Friedman, Arlington, MA (US); James Wiese, San Ramon, CA (US)

(73) Assignee: EMC Corporation, Hopkinton, MA (US)

( * ) Notice: Subject to any disclaimer, the term of this patent is extended or adjusted under 35 U.S.C. 154(b) by 38 days.

(21) Appl. No.: 13/336,570

(22) Filed: Dec. 23, 2011

(51) Int. Cl.
*H04L 29/06* (2006.01)

(52) U.S. Cl.
USPC .................................. 726/25; 726/5

(58) Field of Classification Search
USPC .......................................... 726/25, 5
See application file for complete search history.

(56) References Cited

U.S. PATENT DOCUMENTS

| | | | | |
|---|---|---|---|---|
| 6,463,459 | B1 * | 10/2002 | Orr et al. ........................ | 709/203 |
| 2006/0026421 | A1 * | 2/2006 | Gasparini et al. ............. | 713/156 |
| 2006/0123472 | A1 * | 6/2006 | Schmidt et al. ................ | 726/8 |
| 2006/0272011 | A1 * | 11/2006 | Ide et al. ........................ | 726/5 |
| 2007/0101432 | A1 * | 5/2007 | Carpenter ...................... | 726/25 |
| 2007/0143851 | A1 * | 6/2007 | Nicodemus et al. ........... | 726/25 |
| 2010/0251366 | A1 * | 9/2010 | Baldry ............................ | 726/22 |
| 2011/0213956 | A1 * | 9/2011 | Mukkara et al. ............... | 713/152 |
| 2011/0238992 | A1 * | 9/2011 | Jancula et al. ................. | 713/168 |

OTHER PUBLICATIONS

Lenzini, Gabriele, Mortaza S. Bargh, and Bob Hulsebosch. "Trust-enhanced security in location-based adaptive authentication." Electronic Notes in Theoretical Computer Science 197.2 (2008): 105-119.*

* cited by examiner

*Primary Examiner* — Kambiz Zand
*Assistant Examiner* — Michael Guirguis
(74) *Attorney, Agent, or Firm* — BainwoodHuang

(57) ABSTRACT

A technique controls launching of a client application on an electronic device. The technique involves, after the client application is installed on the electronic device, providing input from the electronic device to an adaptive authentication service of a remote authentication server. The technique further involves receiving a credential from the adaptive authentication service of the remote authentication server in response to a successful adaptive authentication result which is based on the input provided from the electronic device. The technique further involves invoking the client application with the credential on the electronic device to establish a trusted session between the client application and an application server. Such a technique is well suited for use by multi environment clients such as general purpose computers, tablets and smart phones.

19 Claims, 5 Drawing Sheets

ESTABLISHING A TRUSTED SESSION FROM A NON-WEB CLIENT USING ADAPTIVE AUTHENTICATION

BACKGROUND

Some conventional computerized environments require user authentication before granting access. Examples of such conventional computerized environments include a virtual desktop infrastructure (VDI) environment, and a virtual private network (VPN).

In general, to configure a user's computer to connect to such a computerized environment, a specialized client program is installed on the user's computer. Such a client program is typically configured to communicate with an environment server which manages the environmental infrastructure.

Once the client program is properly installed on the user's computer, the user starts the client program and enters a username, a password and perhaps a one-time passcode (OTP) (e.g., from a smartcard). With the client program now running on the user's computer, the client program then conveys these factors to the environment server. If the environment server finds proper matches, authentication is considered successful and the environment server allows the user's computer to access the computerized environment. However, if the environment server does not find a proper match of the username and password, authentication is considered unsuccessful and the environment server denies access to the computerized environment.

SUMMARY

Unfortunately, there are deficiencies to the above-described conventional approach to managing access to a computerized environment. For example, the above-described conventional approach does not employ adaptive authentication which is capable of assessing risk based on a variety of adaptive authentication factors such as browser cookie data, user habits and a geographical location associated with the user's computer. Nevertheless, risk assessments based on these adaptive authentication factors would provide a stronger means of authentication when controlling access to the computerized environment.

In contrast to the above-described conventional approach to managing access to a computerized environment, improved techniques involve the use of adaptive authentication when establishing a trusted session between a client application and an application server (a VDI server, a VPN server, or similar type of environment server). Involvement of adaptive authentication can be made by utilizing a client web browser of an electronic device of a user as a front-end to properly activating the client application. Along these lines, if adaptive authentication is successful, a remote authentication server provides a credential (e.g., a temporary certificate) to the electronic device of the user, and the client application can then be invoked with the credential as part of the process of joining an electronic environment. However, if adaptive authentication is unsuccessful, the remote authentication server does not provide the credential thus preventing the electronic device from properly activating the client application and accessing the electronic environment. Accordingly, adaptive authentication is available even in a situation where involvement of a client web browser is traditionally unnecessary (e.g., when simply joining a computerized environment through a conventional adapter application).

One embodiment is directed to a method of launching a client application on an electronic device. The method includes, after the client application is installed on the electronic device, providing input from the electronic device to an adaptive authentication service of a remote authentication server. The method further includes receiving a credential from the adaptive authentication service of the remote authentication server in response to a successful adaptive authentication result which is based on the input provided from the electronic device. The method further includes invoking the client application with the credential on the electronic device to establish a trusted session between the client application and an application server. Such a method is well suited for use by multi environment clients such as general purpose computers, tablets and smart phones.

In some arrangements, the electronic device automatically activates the client application on the electronic device in response to receipt of the credential from the adaptive authentication service. Such arrangements simplify actions of the user when establishing the trusted session. Moreover, in some arrangements, the credential acts as a key to unlock use of the client application on the electronic device.

In some arrangements, the electronic device automatically starts a timer on the electronic device which permits access to the trusted session for a fixed amount of time. That is, the credential essentially operates as a license for a limited time period. In these arrangements, the trusted session terminates or the credential is no longer valid upon the expiration of the timer.

In some arrangements, the user receives an out of band challenge from the remote authentication server in response to a failed adaptive authentication attempt. The out of band challenge enables the user to establish a trusted session even when the adaptive authentication assessment indicates that the risk exceeds a normal threshold (i.e., referred to as step up authentication). Additionally, if the legitimate user did not make the authentication attempt, the out of band challenge operates as a signal to the legitimate user that an imposter has attempted to authenticate in place of the legitimate user.

Other embodiments are directed to systems, apparatus, processing circuits, computer program products, and so on. Some embodiments are directed to various processes, electronic components and circuitry which are involved in performing adaptive authentication operations in situations that do not traditionally involve the use of a client web browser to access an electronic environment.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves the use of adaptive authentication when establishing a trusted session between a client application and an application server (a VDI server, a VPN server, or similar type of environment server). In particular, a user operates a client web browser of an electronic device to allow a remote authentication server to authenticate the user via adaptive authentication. If adaptive authentication is successful, the remote authentication server provides a credential (e.g., a temporary certificate) to the electronic device, and the client application can then be invoked with the credential as part of the process of joining an electronic environment. However, if adaptive authentication is unsuccessful, the remote authentication server does not provide the credential thus preventing the electronic device from properly activating the client application and accessing the electronic environment. As a result, adaptive authentication is available even in a situation where involvement of a client web browser is traditionally unnecessary.

Figure 1:
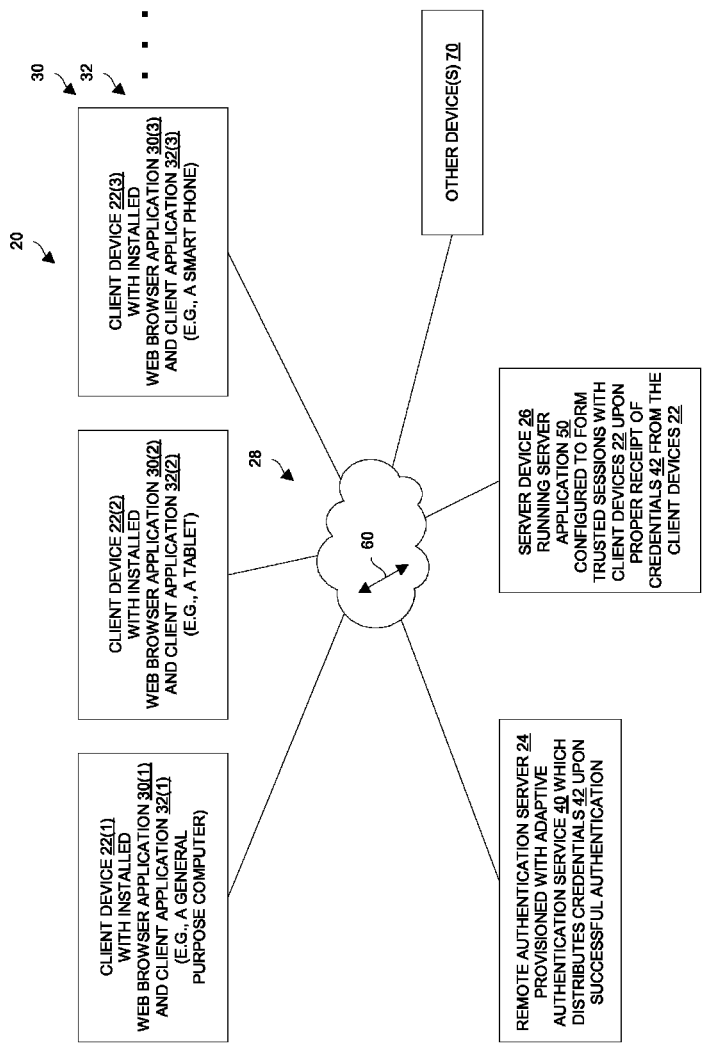
FIG. 1 is a block diagram of an electronic system which utilizes adaptive authentication when establishing a trusted relationship between a client application and an application server.

FIG. 1 shows an electronic system 20 which utilizes adaptive authentication to establish a trusted session between a client application and an application server. The electronic system 20 includes client devices 22(1), 22(2), 22(3), . . . (collectively, client devices 22), a remote authentication server 24, a server device 26, and a communications medium 28.

Each client device 22 has an installed web browser application 30 and an installed client application 32. For example, the client device 22(1) may be a general purpose computer having an installed web browser application 30(1) and an installed client application 32(1). Similarly, the client device 22(2) may be an electronic tablet device having an installed web browser application 30(2) and an installed client application 32(2). Likewise, the client device 22(3) may be a smart phone having an installed web browser application 30(3) and an installed client application 32(3), and so on. It should be understood that the client devices 22 can be thought of as multi environment devices since they are capable of joining multiple electronic environments (e.g., a VDI environment, a VPN, etc.) even though the installed client applications 32 may not be web clients.

The remote authentication server 24 is provisioned with an adaptive authentication service 40. As will be explained in further detail shortly, the adaptive authentication service 40 is constructed and arranged to obtain adaptive authentication factors from web browsers of the client devices 22 and, when adaptive authentication is successful, generate and distribute credentials 42 to the client devices 22. The credentials 42 are required by the client applications 32 to properly established trusted sessions to an electronic environment provided by the server device 26.

The server device 26 runs a server application 50 which is constructed and arranged to communicate with the client applications 32 installed on the client devices 22. In particular, the server application 50 manages and maintains an electronic environment and controls whether the client applications 32 are allowed to access the electronic environment.

In some arrangements, the server application 50 operates as a VDI server which provides a VDI environment, and the client applications 22 communicate with the server application 50 in order to access the VDI environment. In another arrangement, the server application 50 operates as a VPN server which provides a VPN environment, and the client applications 22 communicate with the server application 50 in order to access the VPN. Other types of applications are suitable for use as well.

The communications medium 28 connects the various components of the electronic system 20 together to enable these components to exchange electronic signals 60 (e.g., see the double arrow 60). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. As will be explained in further detail below, portions of the electronic system 20 may even be separated into different areas for stronger security, e.g., a secure user area, a secure server area, a demilitarized zone, and so on.

During operation of the electronic system 20, users of the client devices 22 (i.e., computer users, tablet users, smart phone users, and so on) are capable of obtaining access to an electronic environment which is managed by the server device 26. As mentioned above, examples of such electronic environments include a VDI environment, a VPN, and similar computerized environments such as an IPsec supported environment, and electronic environments which serve corporate or host applications from central servers to clients.

To join the electronic environment, a user of a client device 22 opens a web browser (i.e., specialized web browsing circuitry formed by running the web browser application 30 on a processor of the client device 22) and conducts an exchange with the remote authentication server 24. During this exchange, the adaptive authentication service 40 performs an adaptive authentication operation based on adaptive authentication factors received from the web browser. Such adaptive authentication factors may include a distinctive client device identifier, browser cookie data, user habits and a geographical location associated with the client device 22, and so on.

If the adaptive authentication operation results in successful adaptive authentication, the adaptive authentication service 40 provides a credential 42 to the client device 22. The web browser invokes the installed client application 32 on the client device 22 in response to receipt of the credential 42 and, in some arrangements, passes the credential 42 on to the server device 26 which then verifies the credential 42 before allowing a trusted session to be formed between the client application 32 and the server application 50.

If the adaptive authentication operation results in unsuccessful adaptive authentication, the adaptive authentication service 40 does not provide a credential 42 to the client device 22. Without the credential 42, the installed client application 32 on the client device 22 is unable to establish a trusted session with the server application 50 running on the server device 26. In some arrangements, the client device 22 is unable to properly invoke the client application 32 without the credential 42. In other arrangements, even if the client device 22 is able to invoke the client application 32 without the credential 42, the server device 26 can refuse to form a trusted session with the client application 32 from its end if the server device 26 does not receive the credential 42. As a result, the client device 22 is prevented from joining the electronic environment.

In some arrangements, when the adaptive authentication operation fails, the adaptive authentication service 40 sends an out of band challenge to the legitimate user associated with the client device 22. For example, suppose that a general purpose computer (see the client device 22(1)) and a smart phone (see the client device 22(3)) belong to the same legitimate user. Here, if the adaptive authentication operation through the user's general purpose computer is unsuccessful, the adaptive authentication service 40 can send an out of band challenge to the user's smart phone, e.g., an SMS message which requires a correct answer to the challenge.

It should be understood that, if the legitimate user answers the out of band challenge correctly, the adaptive authentication service 40 sends the credential 42 to the user's general purpose computer (see the client device 22(1)) so that the installed client application 32 on the user's general purpose computer is able to establish a trusted session with the server application 50 running on the server device 26. However, if the legitimate user did not make the authentication attempt from the user's general purpose computer, the out of band challenge operates as a signal to the legitimate user that an imposter has attempted to authenticate in place of the legitimate user.

It should be further understood that the electronic system 20 may include other devices 70 as well such as electronic equipment which is reachable by client devices 22 only after the client devices 22 have established the trusted sessions to join the electronic environment, as well as devices which do not participate as part of the electronic environment (e.g., public network devices). In some arrangements, the electronic system 20 includes devices running in different secure areas as well as other devices (e.g., adapter devices) running in demilitarized areas. Further details will now be provided with reference to FIG. 2.

Figure 2:
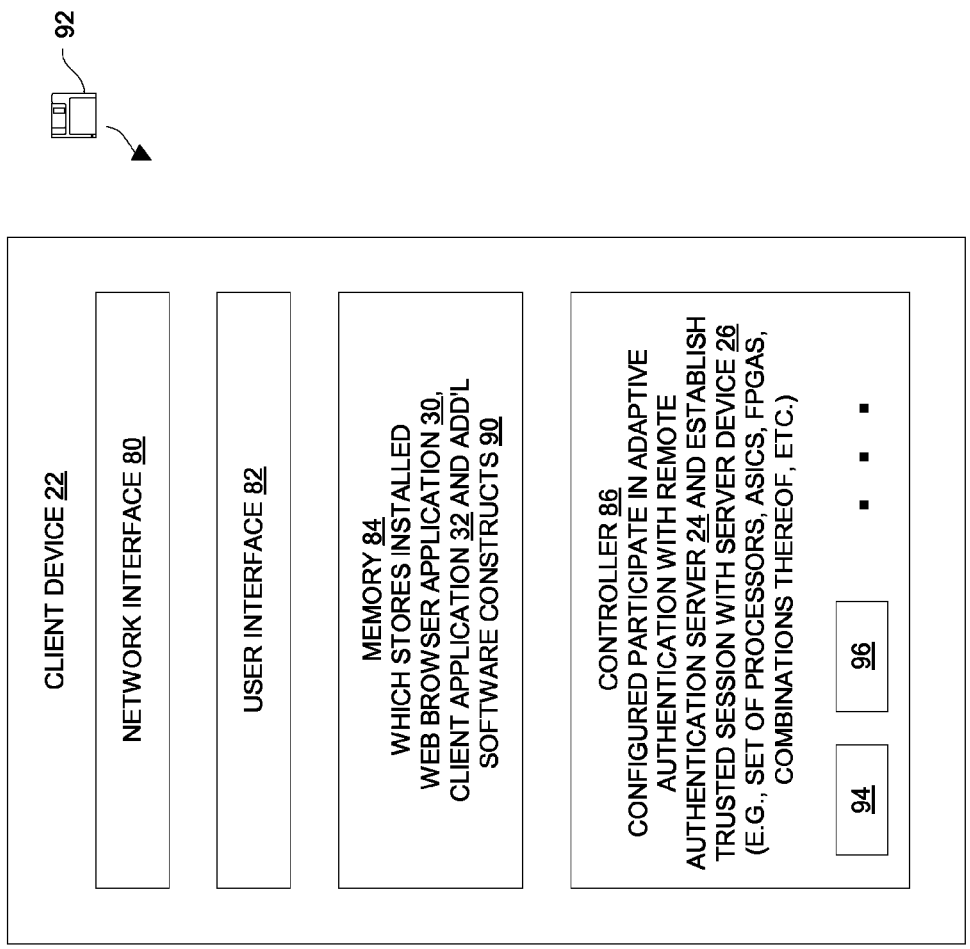
FIG. 2 is a block diagram of multi environment client of the electronic system of FIG. 1.

FIG. 2 shows particular details of a client device 22. The client device 22 includes a network interface 80, a user interface 82, memory 84, and a controller 86.

The network interface 80 is constructed and arranged to connect the client device 22 to the communications medium 28 (FIG. 1) and thus enables the client device 22 to communicate with other devices of the electronic system 20. In some arrangements, the network interface 80 is implemented in the form of a network card or a network adapter module. In some arrangements, the network interface 80 includes a wireless transceiver for wireless communications.

The user interface 82 of the client device 22 is constructed and arranged to receive input from the user and provide output to the user. In some arrangements, the user interface 82 includes a keyboard, a mouse, and a display (e.g., for a workstation or desktop setting). In other arrangements, the user interface 82 includes an integrated touch screen which is responsible for handling both user input and output (e.g., for a portable or hand held setting).

The memory 84 is constructed and arranged to store the web browser application 30 and the client application 32. The memory 84 may store additional software constructs 90 such as an operating system, user level applications, and identification information relating to the client device 22 (e.g., browser cookies, a unique device identifier (UDID), an international mobile subscriber identity (IMSI), combinations thereof, and so on). It should be understood that the memory 84 refers to both volatile and non-volatile storage.

The controller 86 of the client device 22 enables the client device 22 to participate in adaptive authentication with the remote authentication server 24, to establish trusted session with the server device 26, and to perform useful work. It should be understood that the controller 86 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 92 is capable of delivering all or portions of the software to the client device 22. The computer program product 92 has a non-transitory (or non-volatile) computer readable medium which stores a set of instructions which controls one or more operations of the client device 22. Examples of suitable computer readable storage media include tangible articles of manufacture and apparatus which store instructions in a non-volatile manner such as CD-ROM, flash memory, disk memory, tape memory, and the like.

In the context of a set of processors and specialized software, it should be understood that the set of processors running this software forms specialized circuitry which is constructed and arranged to perform particular operations of the improved techniques. As will be explained in further detail shortly, in some arrangements, the controller 86 includes automated activation circuitry 94 to automatically activate the client application 32 in response to successful authentication with the remote authentication server 24 and receipt of the certificate 42. In some arrangements, the controller 86 further includes timer circuitry 96 which imposes a time limit on validity of the certificate 42 and thus a time limit on the trusted session. Further details will now be provided with reference to FIG. 3.

Figure 3:
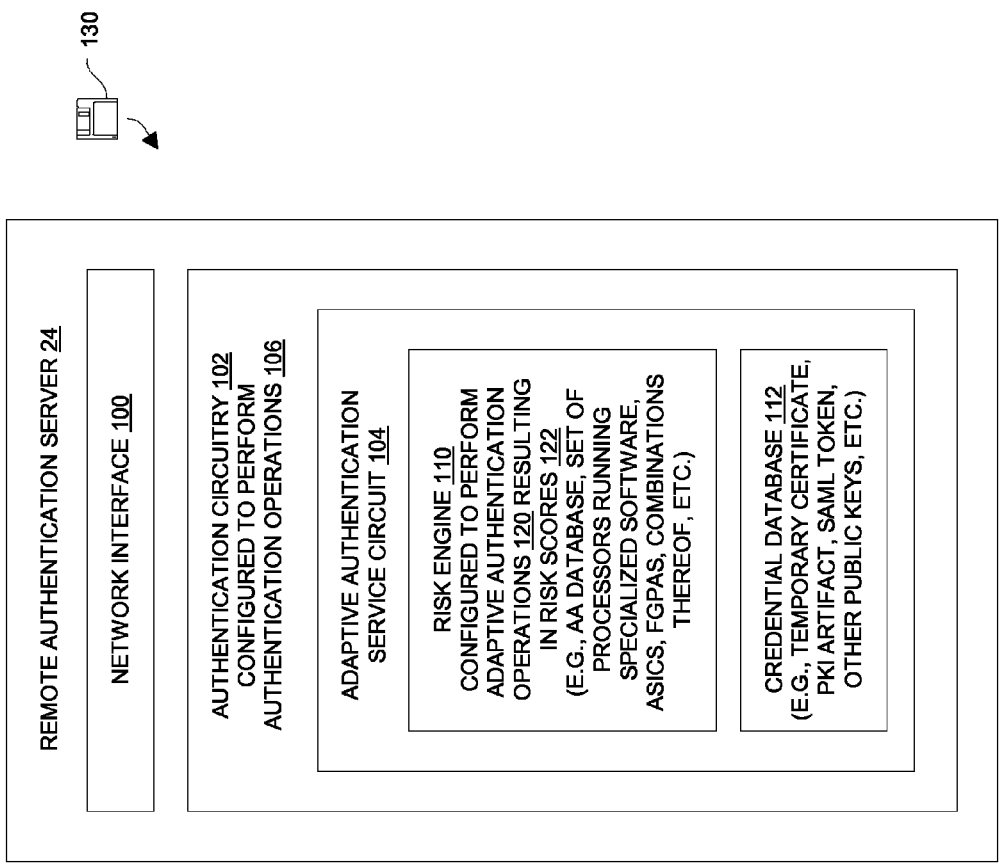
FIG. 3 is a block diagram of a remote authentication server of the electronic system of FIG. 1.

FIG. 3 shows particular details of the remote authentication server 24. The remote authentication server 24 includes a network interface 100, and authentication circuitry 102.

The network interface 100 is constructed and arranged to connect the remote authentication server 24 to the communications medium 28 (FIG. 1). Such connectivity enables the remote authentication server 24 to communicate with other devices of the electronic system 20.

The authentication circuitry 102 includes an adaptive authentication service circuit 104, and is constructed and arranged to perform authentication operations 106. In some arrangements, the authentication operations 106 are exclusively risk-based. In other arrangements, the authentication operations 106 involve a combination of risk-based authentication (by the adaptive authentication service circuit 104) as well as standard authentication (e.g., traditional multi-factor authentication).

In connection with adaptive authentication, the adaptive authentication management circuit 104 includes a risk engine 110 and a credential database 112. The risk engine 110 is constructed and arranged to perform adaptive authentication operations 120 on adaptive authentication factors from the client devices 22 in order to generate risk scores 122. For example, from the adaptive authentication factors, the risk engine 110 is able to assess whether the user is authenticate (or an imposter) by comparing current browser capabilities, user habits, etc. to previously stored data. The risk score 122 resulting from each adaptive authentication operation 120 is a numerical value which quantitatively identifies a level of risk, and which can be compared to a tunable threshold to determine whether that adaptive authentication operation 120 is successful or unsuccessful. In some arrangements, the risk engine 120 includes fuzzy logic circuitry which applies fuzzy logic analysis when evaluating adaptive authentication factors collected from the client devices 22.

Similar to the controllers 86 of the client devices 22, it should be understood that the risk engine 110 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 130 is capable of delivering all or portions of the software to the remote authentication server 24. The computer program product 130 has a non-transitory (or non-volatile) computer readable medium which stores a set of instructions which controls one or more operations of the remote authentication server 24. Examples of suitable computer readable storage media include tangible articles of manufacture and apparatus which store instructions in a non-volatile manner such as CD-ROM, flash memory, disk memory, tape memory, and the like.

The credential database 112 is constructed and arranged to store data from which the credentials 42 are generated as well as the generated credentials 42 themselves. In particular, the authentication circuitry 102 generates and distributes the credentials 42 to the client devices 22 in response to successful authentication. In some arrangements, the adaptive authentication service circuit 104 stores each credential 42 in a separate entry together with an identifier identifying the client device 22 to which that the credential 42 was sent, and a timestamp of identifying when the credential 42 was sent. Accordingly, the adaptive authentication service circuit 104 is able to track distribution of the credentials 42, as well as manage the lifecycles of the credentials 42 (e.g., inform the server device 26 as to which credentials 42 are currently valid, and which credentials 42 have expired, and so on).

It should be understood that a variety of data elements are suitable for use as the credentials 42. Examples include temporary certificates, Public Key Infrastructure (PKI) artifacts, SAML tokens, other derived keys and cryptographic data types, combinations thereof, etc. Further details will now be provided with reference to FIG. 4.

Figure 4:
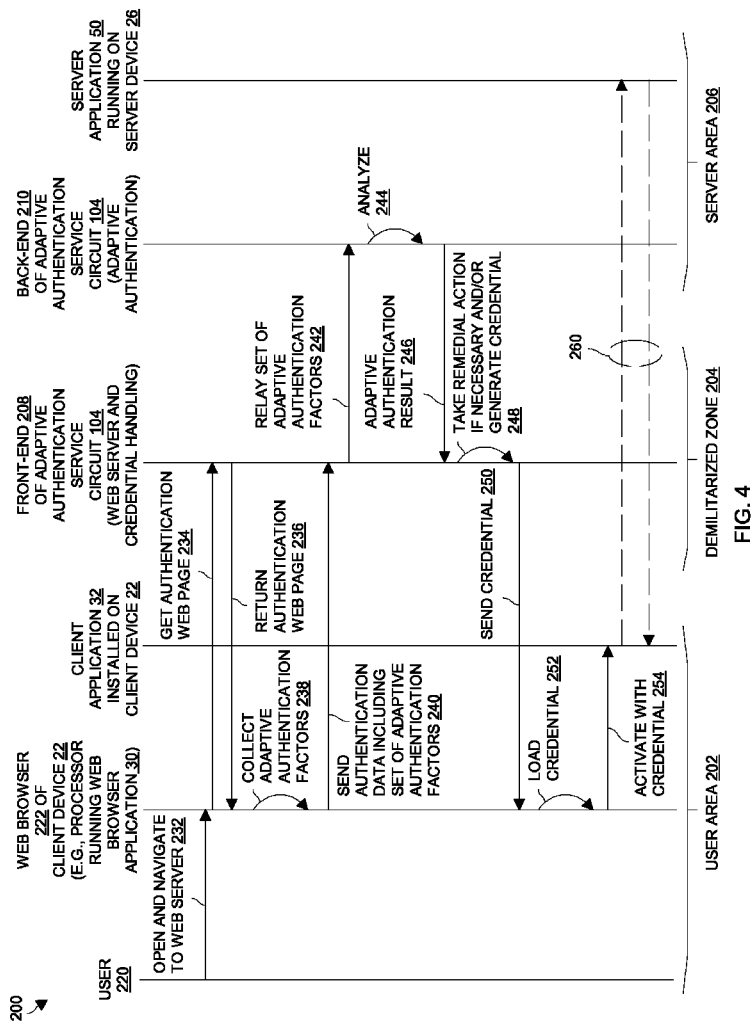
FIG. 4 is a sequence diagram illustrating an example which utilizes adaptive authentication when establishing a trusted relationship between a client application and an application server.

FIG. 4 is a sequence diagram 200 illustrating various communications among the components of the electronic system 20 when establishing a trusted relationship between a client device 22 and the server device 26 (also see FIG. 1). In the sequence diagram 200, it is assumed that the web browser application 30 and the client application 32 are already properly installed on the client device 22.

By way of example, the various components of the electronic system 20 are shown as being distributed across a secure user area 202, a demilitarized zone (DMZ) 204, and a secure server area 206. The client device 22 resides in the secure user area 202, while the server device 26 resides in the secure server area 206.

Additionally, portions of the remote authentication server 24 are distributed within both the DMZ 204 and the secure server area 206. In some arrangements, the portions of the remote authentication server 24 are physically separated (i.e., in separate devices). In other arrangements, the remote authentication server 24 physically sits within a common footprint, but some circuitry connects to the DMZ 204 and other circuitry connects to the server area 206. For either arrangement, the adaptive authentication management circuit 104 is divided into a front-end 208 which essentially resides in the DMZ 204, and a back-end 210 which essentially resides in the server area 206. Since the front-end 208 resides in the DMZ 206, the front-end 208 is able to communicate with components in both the user area 202 and the server area 206 without extensive measures. Along these lines, the front-end 208 is constructed and arranged to operate as a web server as well as to generate and distribute the credentials 42. On the other hand, the back-end 210 performs the authentication operations 106 and is safely within the secure server area 206. Accordingly, the front-end 208 operates an adapter to the risk engine 110 of the adaptive authentication management circuit 104 (also see FIG. 3).

Further details of how a user 220 operates a client device 22 to join an electronic environment provided by the server device 26 will now be provided. Initially, the user 220 opens a web browser 222 of the client device 22 (i.e., a specialized circuit formed by a processor of the client device 22 running the web browser application 30) and navigates the web browser 222 to an authentication page of the web server of the front-end 208 of the remote authentication server 24. Along these lines, the user 220 may enter a URL directing the web browser 222 to the web server. This user action is illustrated by arrow 232 in FIG. 4.

In response to the user action, the web browser 222 requests an authentication web page from the front-end 208 of the remote authentication server 24. Along these lines, the web browser 222 sends a HyperText Transfer Protocol (HTTP) message to the remote authentication server 24 requesting the authentication web page. This request activity is illustrated by arrow 234.

In response to the request for the authentication web page, the front-end 208 of the remote authentication server 24 provides the authentication web page as an HTTP response. This response activity is illustrated by arrow 236. Since the front-end 208 of the remote authentication server 24 resides within the DMZ 204, the front-end 208 is able to properly communicate with the client device 22 without extensive measures.

In response to receipt of the authentication web page, the web browser 222 collects a set of adaptive authentication factors. The collection activity is illustrated by the arrow 238. In some arrangements, the authentication web page is coded (e.g., using JavaScript) to collect cookie data (e.g., browser capabilities), device identification data (e.g., a distinctive device ID), user habits (e.g., typing speeds, etc.), and geographical location information associated with the client device 22 (e.g., by identifying the ISP). In some arrangements, the authentication web page is a null page with the embedded code. In other arrangements, the authentication web page includes dialog boxes to query the user 220 for standard authentication factors such as a username, a password, a PIN, and so on. It should be understood that, when the processor of the client device 22 runs both the web browser application 30 and the code of the authentication web page, a specialized circuit is formed which performs specialized operations of particular embodiments of the improved technique.

Next, the web browser application 30 provides the collected authentication data including the set of adaptive authentication factors to the front-end 208 of the remote authentication server 24. As just mentioned, the authentication data may further include the standard authentication factors (e.g., a username and password, etc.) along with the along with set of adaptive authentication factors. Such information (e.g., browser cookie data, etc.) may be bundled (e.g., in accordance with JavaScript obtained with the authentication web page) as a follow-up HTTP message from the client device 22 to the remote authentication server 24. This activity is illustrated by the arrow 240.

Upon receipt of the authentication data, the front-end 208 of the remote authentication server 24 relays the authentication data to the back-end 210 of the remote authentication server 24 residing in the server area 206. This activity is illustrated by the arrow 242. Accordingly, the risk engine 110 of the adaptive authentication management circuit 104 now has the set of adaptive authentication factors available as input to an adaptive authentication operation 120 (also see FIG. 3).

Next, the back-end 210 of the remote authentication server 24 performs the adaptive authentication operation 120 using the set of adaptive authentication factors as input. Along these lines, the risk engine 110 analyzes the adaptive authentication factors and outputs a risk score 122 (FIG. 3). This adaptive authentication activity is illustrated by the arrow 244 in FIG. 4.

The back-end 210 of the remote authentication server 24 provides the result of the adaptive authentication operation to the front-end 208 of the remote authentication server 24. In some arrangements, the back-end 210 compares the risk score 122 to a threshold and provides, as the result, an indication of whether the risk score exceeds the threshold. In other arrangements, the back-end 210 provides the risk score 122 itself so that the front-end 208 can compare the risk score 122 to the threshold. This delivery activity is illustrated by the arrow 246.

In any event, if the risk score 122 is less than the threshold, authentication is considered successful and the front-end 208 generates a credential 42 (also see FIGS. 1 and 3) for use by the client device 22. The front-end 208 may store a copy of the credential 42 in the credential database 112 and notify the server device 26 (via the back-end 210). However, if the risk score 122 exceeds the threshold, authentication is considered unsuccessful and the front-end 208 performs a remedial activity. In some arrangements, the remedial activity include sending an out of band challenge to the user (e.g., an SMS message to the user's smart phone) to give the user another chance to successfully authenticate. This activity is illustrated by the arrow 248.

It should be understood that the process of joining the electronic environment stops if authentication remains unsuccessful. Accordingly, access to the electronic environment (e.g., a VDI environment, a VPN, etc.) is strongly protected via adaptive authentication.

However, if authentication is successful, the front-end 208 then provides the credential 42 to the web browser 222 of the client device 22. This activity is illustrated by the arrow 250.

When the web browser 222 receives the credential 42 (e.g., a temporary certificate), the web browser 222 loads the credential 42. This activity is illustrated by arrow 252. In some arrangements, the web browser 222 places the credential 42 in a designated location (e.g., a file, a folder, etc.) for access by the installed client application 32. In these arrangements, when the client device 22 runs the client application 32, the credential 42 is evaluated as a cryptographic element either by the client application 32 (or, as will be explained shortly, remotely by the server device 26 or both).

With the credential 42 now loaded within the client device 22, the web browser 222 invokes the installed client application 32 on the client device 22. This activity is illustrated by arrow 254.

In some arrangements, the web browser 222 treats the receipt of a proper credential as a trigger to automatically activate the installed client application 32. Along these lines, the web browser 222 (or another trigger-style control circuit of the client device 22) is configured to automatically detect receipt of the credential 42 and invoke the client application 30 upon such receipt (also see the automated activation circuitry 94 in FIG. 2). In some arrangements, the credential 42 serves as cryptographic element to unlock the ability to activate the client application 32 on the client device 22. That is, without the credential 42, the client application 32 cannot be properly invoked on the client device 22.

Additionally, in some arrangements, the web browser 222 or other control circuit imposes a time limit on the validity of the credential 42. The particular amount of time may be dictated by the remote authentication server 24 or alternatively imposed locally within the client device 22. For example, specialized code running on a processor of the client device 22 may form timer circuitry 96 (also see FIG. 2) which prevents the client application 32 from running longer than the imposed amount of time thus dictating a time limit on the trusted session. In these arrangements, the timer circuitry 96 starts counting and, upon expiration of the time limit, disables the client application 32 from properly running on the client device 22.

At this point, the installed client application 32 communicates with the server application 50 running on the server device 26 to establish the trusted session 260 (i.e., illustrated by reference numeral 260 in FIG. 4). The exchanges are illustrated as dashed arrows since the actual trusted session may take a variety of forms depending on the particular topology of the electronic system 20 and the type of the electronic environment. In some arrangements, the user 220 is immediately prompted to authenticate with the server device 26, i.e., to authenticate with the server device 26 in manner which is independent of adaptively authenticating with the risk engine 110 of the remote authentication server 24 such as by providing a username and password to the server device 26. This extra level of authentication provides added security to the electronic environment.

Additionally, in some arrangements, the installed client application 32 is required to provide the credential 42 in order to join the electronic environment provided by the server application 50. Moreover, in some arrangements, the installed client application 32 connects with a server adapter in the DMZ 204 (i.e., a front-end to the server application 50) and communicates with the server application 50 only indirectly through the server adapter. Of course, other arrangements are suitable for use as well.

It should be understood that once the trusted session 260 is established, the user 220 is able to close the web browser 222 on the client device 22. Along these lines, the web browser 222 may be prevented from accessing the electronic environment (e.g., the VPN) during the trusted session 260 and thus there would be no reason for the user to maintain operation of the web browser 222 in the context of accessing the electronic environment. Further details will now be provided with reference to FIG. 5.

Figure 5:
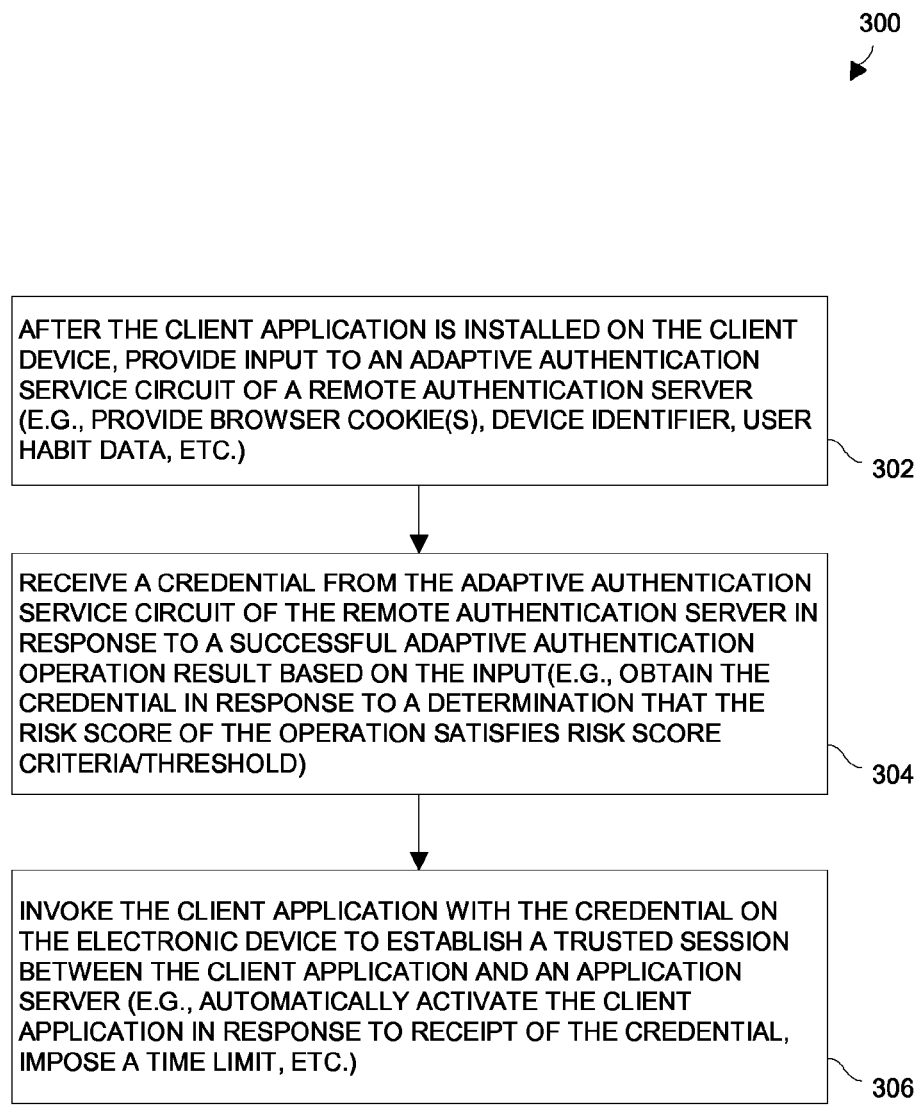
FIG. 5 is a flow diagram of a procedure which is performed by the multi environment client of FIG. 2.

FIG. 5 shows a procedure 300 which is performed by a client device 22 to launch the installed client application 32. In step 302, after the client application 32 is properly installed on the client device 22, the client device 22 provides input to an adaptive authentication management circuit 104 of the remote authentication server 24 (also see arrows 238, 240 and 242 in FIG. 4). Here, the client device 22 collects and provides, as the input, a set of adaptive authentication factors such as 22 browser cookies, a device identifier (e.g., a UDID, an IMSI, etc.), user specific tendencies, and so on, to enable the adaptive authentication management circuit 104 of the remote authentication server 24 to perform a risk-based authentication operation resulting in a numerical risk score 122 (also see FIGS. 3 and 4).

In step 304, the client device 22 receives a credential 42 from the adaptive authentication management circuit 104 of the remote authentication server 24 in response to a successful adaptive authentication operation result based on the input (also see the arrows 246, 248 and 250 in FIG. 4). That is, when the risk score 112 is lower than a predefined risk score threshold to satisfy risk criteria of the remote authentication server 24, the remote authentication server 24 generates and delivers the credential 42 to the client device 22. One should appreciate that the use of the risk score threshold provides the ability to modify the threshold to change the level of risk tolerated by the adaptive authentication management circuit 104 (i.e., tune the operation).

In step 306, the client device 22 invokes the client application 32 with the credential 42 on the client device 22 to establish a trusted session 260 between the client application 32 and an application server 24 (also see arrows 252 and 254 in FIG. 4). Here, circuitry of the client device 22 may automatically activate the client application 32 (e.g., enable/unlock or launch the client application 32, etc.). Additionally, the client device 22 may impose a time limit on the client application 22 and disable or terminate the client application 22 (and thus the trusted session 260) upon expiration of the time limit. Accordingly, the electronic system 20 (FIG. 1) enjoys stronger security provided by adaptive authentication.

As described above, an improved technique involves the use of adaptive authentication when establishing a trusted session 260 between a client application 32 and an application server 26 (a VDI server, a VPN server, or similar type of environment server). Along these lines, if adaptive authentication is successful, a remote authentication server 24 provides a credential 42 (e.g., a temporary certificate) to an electronic device 22 of a user, and the client application 32 can be invoked with credential 42 to access an electronic environment. However, if adaptive authentication is unsuccessful, the remote authentication server 24 does not provide the credential 42 thus preventing the electronic device 22 from accessing the electronic environment. Accordingly, adaptive authentication is available even in a situation where involvement of a client web browser 30 is traditionally unnecessary (e.g., when joining a computerized environment using a non-web client).

While various embodiments of the invention have been particularly shown and described, it will be understood by those skilled in the art that various changes in form and details may be made therein without departing from the spirit and scope of the invention as defined by the appended claims.

For example, in connection with FIG. 4, the client device 22 was described more or less as a general purpose computer by way of example only. It should be understood that exchange in FIG. 4 could involve a user operating a different type of device such as a tablet, a smart phone, a laptop notebook, a netbook, and so on. Such alternative thick and thin multi environment clients are suitable for use by various embodiments of the invention.

What is claimed is:

1. A method of launching a client application on an electronic device, the method comprising:
   after the client application is installed on the electronic device, providing input from the electronic device to an adaptive authentication service of a remote authentication server;
   receiving a credential from the adaptive authentication service of the remote authentication server in response to a successful adaptive authentication result which is based on the input provided from the electronic device; and
   invoking the client application with the credential on the electronic device to establish a trusted session between the client application and an application server;
   wherein providing the input from the electronic device to the adaptive authentication service of the remote authentication server includes providing a set of adaptive authentication factors from a web browser of the electronic device as input to a risk-based authentication operation performed by the adaptive authentication service, the risk-based authentication operation outputting a numerical risk score which quantitatively identifies a level of risk;
   wherein receiving the credential from the adaptive authentication service includes obtaining the credential in response to a determination, by the adaptive authentication service, that the numerical risk score exceeds a predefined risk score threshold maintained by the adaptive authentication service on behalf of the application server; and
   wherein invoking includes:
   automatically activating the client application on the electronic device in response to receipt of the credential from the adaptive authentication service.

2. A method as in claim 1 wherein providing the set of adaptive authentication factors includes:
   sending a HyperText Transfer Protocol (HTTP) message from the web browser of the electronic device to the adaptive authentication service of the remote authentication server through a computerized network, the HTTP message including an HTTP cookie; and
   wherein cookie data of the HTTP cookie is processed as at least some of the adaptive authentication factors by the risk-based authentication operation to determine the numerical risk score.

3. A method as in claim 1 wherein providing the set of adaptive authentication factors includes:
   running JavaScript to collect and provide browser settings and user preferences from the web browser to the adaptive authentication service; and
   wherein the browser settings and user preferences are processed as at least some of the adaptive authentication factors by the risk-based authentication operation to determine the numerical risk score.

4. A method as in claim 1 wherein providing the set of adaptive authentication factors includes:
   providing, to the adaptive authentication service, an electronic device identifier which distinctively identifies the electronic device among other electronic devices, and geographical location information which identifies a location associated with the electronic device; and
   wherein the electronic device identifier and the geographical location information are processed as at least some of the adaptive authentication factors by the risk-based authentication operation to determine the numerical risk score.

5. A method as in claim 1 wherein receiving the credential from the adaptive authentication service includes:
   obtaining, as the credential, a Public Key Infrastructure (PKI) certificate assigned to the electronic device.

6. A method as in claim 1, further comprising:
   automatically starting a timer on the electronic device, and automatically terminating the client application upon an expiration of the timer.

7. A method as in claim 1, further comprising:
   at a time following termination of the trusted session between the client application and the application server, providing new input from the electronic device to the adaptive authentication service of the remote authentication server; and
   receiving an out of band challenge in response to an unsuccessful adaptive authentication result which is based on the new input provided from the electronic device.

8. A method as in claim 1, further comprising:
   installing the client application on the electronic device to configure the electronic device as a multi-environment client which is capable of operating within infrastructures of multiple electronic environments;
wherein the application server is constructed and arranged to provide at least part of an infrastructure of a particular electronic environment of the multiple electronic environments.

9. A method as in claim 8 wherein invoking includes:
providing authentication credentials from the electronic device to the application server to authenticate with the application server separately from involvement of the adaptive authentication service of the remote authentication server.

10. A method as in claim 8 wherein the application server is constructed and arranged to operate as a virtual desktop infrastructure (VDI) server; and
wherein invoking includes obtaining access to a VDI which is managed by the VDI server.

11. A method as in claim 8 wherein the application server is constructed and arranged to operate as a virtual private network (VPN) server; and
wherein invoking includes obtaining access to a VPN which is managed by the VPN server.

12. A method as in claim 11, further comprising:
preventing the web browser from accessing the VPN during the trusted session between the client application and the application server.

13. A method as in claim 11, further comprising:
closing the web browser while the electronic device accesses the VPN.

14. A method as in claim 1 wherein the client application on the electronic device resides at a first location;
wherein the adaptive authentication service of the remote authentication server resides at a second location which is separate from the first location;
wherein the application server resides at a third location which is separate from the first and second locations; and
wherein invoking the client application to establish the trusted session between the client application and the application server includes:
enabling a user to operate the application server in a secure server zone in the third location remotely from the client application on the electronic device in a secure user zone of the first location of the end user device using at least a portion the adaptive authentication server in a demilitarized zone in the second location, wherein communication between the first and third zones are via the second zone.

15. A method as in claim 1 wherein the electronic device is constructed and arranged to run the client application only when the credential from the adaptive authentication service of the remote authentication server is present on the electronic device; and wherein the method further comprises:
prior to receiving the credential from the adaptive authentication service of the remote authentication server, disabling execution of the client application on the electronic device.

16. An electronic device, comprising:
a communications interface;
memory which stores a client application; and
a controller coupled to the communications interface and the memory, the controller being constructed and arranged to:
provide, after the client application is installed on the electronic device, input to an adaptive authentication service of a remote authentication server through the communications interface,
receive a credential from the adaptive authentication service of the remote authentication server through the communications interface in response to a successful adaptive authentication result which is based on the input provided from the electronic device, and
invoke the client application with the credential on the electronic device to establish a trusted session between the client application and an application server through the communications interface;
wherein the controller provides the input from the electronic device to the adaptive authentication service of the remote authentication server including a set of adaptive authentication factors from a web browser of the electronic device as input to a risk-based authentication operation performed by the adaptive authentication service, the risk-based authentication operation outputting a numerical risk score which quantitatively identifies a level of risk;
wherein, when the controller receives the credential from the adaptive authentication service, the credential further includes, in response to a determination by the adaptive authentication service, that the numerical risk score exceeds a predefined risk score threshold maintained by the adaptive authentication service on behalf of the application server; and
wherein, when the controller invokes the client application, further includes automatically activating the client application on the electronic device in response to receipt of the credential from the adaptive authentication service.

17. An electronic device as in claim 16 wherein the controller, when providing the input to the adaptive authentication service, is constructed and arranged to:
provide a set of adaptive authentication factors from a web browser as input to a risk-based authentication operation performed by the adaptive authentication service, the risk-based authentication operation outputting a numerical risk score which quantitatively identifies a level of risk.

18. A computer program product having a non-transitory computer readable medium which stores a set of instructions for launching a client application, the set of instructions causing a computerized device to perform a method of:
after the client application is installed on the computerized device, providing input from the computerized device to an adaptive authentication service of a remote authentication server;
receiving a credential from the adaptive authentication service of the remote authentication server in response to a successful adaptive authentication result which is based on the input provided from the computerized device; and
invoking the client application with the credential on the computerized device to establish a trusted session between the client application and an application server;
wherein providing the input from the electronic device to the adaptive authentication service of the remote authentication server includes providing a set of adaptive authentication factors from a web browser of the electronic device as input to a risk-based authentication operation performed by the adaptive authentication service, the risk-based authentication operation outputting a numerical risk score which quantitatively identifies a level of risk;
wherein receiving the credential from the adaptive authentication service includes obtaining the credential in response to a determination, by the adaptive authentication service, that the numerical risk score exceeds a predefined risk score threshold maintained by the adaptive authentication service on behalf of the application server; and wherein invoking includes automatically activating the client application on the electronic device in response to receipt of the credential from the adaptive authentication service.

19. A computer program product as in claim 18 wherein providing the input from the computerized device to the adaptive authentication service of the remote authentication server includes:

providing a set of adaptive authentication factors from a web browser of the computerized device as input to a risk-based authentication operation performed by the adaptive authentication service, the risk-based authentication operation outputting a numerical risk score which quantitatively identifies a level of risk.

\* \* \* \* \*